United States Patent [19]
Frost

[11] Patent Number: 5,582,441
[45] Date of Patent: Dec. 10, 1996

[54] DEVICE FOR APPLYING SAND TO ROADS FOR USE IN VEHICLES

[76] Inventor: Michael T. Frost, 730 I St. #224, Anchorage, Ak. 99501

[21] Appl. No.: 570,480

[22] Filed: Dec. 11, 1995

[51] Int. Cl.$^6$ .................................................. B60B 39/08
[52] U.S. Cl. .................. 291/2; 291/3; 291/15; 291/46; 280/757
[58] Field of Search ................ 291/2, 3, 14, 15, 291/16, 41, 46; 280/757

[56] References Cited

U.S. PATENT DOCUMENTS

| | | | |
|---|---|---|---|
| 1,810,765 | 6/1931 | Herdling . | |
| 1,832,581 | 11/1931 | Riley | 291/46 |
| 2,016,419 | 10/1935 | Elston | 291/36 |
| 2,712,954 | 7/1955 | Huber | 291/2 |
| 2,771,904 | 12/1956 | Doolittle | 291/2 |
| 4,099,688 | 7/1978 | Jayne | 291/3 |
| 4,575,135 | 3/1986 | Cervinka | 291/20 |
| 5,118,142 | 6/1992 | Bish | 291/46 |

FOREIGN PATENT DOCUMENTS

| | | | |
|---|---|---|---|
| 3742326 | 6/1989 | Germany | 291/3 |
| 3208701 | 9/1991 | Japan | 291/3 |

*Primary Examiner*—S. Joseph Morano
*Attorney, Agent, or Firm*—Michael J. Tavella

[57] ABSTRACT

A sand delivery system for use in automobiles, or other vehicles. The device uses the hollow front bumpers found on most modern vehicles today to store bags of sand, which is delivered through a number of nozzles located in the front of the vehicle. A blower system forces the sand through the nozzles and projects the sand in a wide pattern out in front of the vehicle. The system is designed to operate when the vehicle is braking. Because the sand is disbursed out in front of the vehicle, the tires can better utilize the sand for braking. Because the sand is projected out in front of the vehicle only a moderate amount of sand is needed to improve traction, thereby reducing the need for large quantities of sand. The sand delivery system can be tied to a manual switch, the vehicle's brake pedal, or to a computer that is tied into the anti-lock brake systems of a car. In the latter case, sand is only be applied when the anti-lock brake system is activated.

17 Claims, 4 Drawing Sheets

DEVICE FOR APPLYING SAND TO ROADS FOR USE IN VEHICLES

This invention relates to devices for applying sand to roads for use in vehicles and particularly to devices for applying sand to roads for use in vehicles that are housed in the vehicle's bumper.

BACKGROUND OF THE INVENTION

Ice on roads has plagued drivers since vehicles first came into use. Many devices have been developed to help vehicles operate on icy roads. For example, studded tires can be placed on vehicles to improve traction. Not all states permit the use of studded tires, however, because these tires can do serious damage to dry roads. Perhaps the most prevalent method of improving traction on icy roads is applying salt or sand to the roads. Salt can raise the freezing point of water, thereby keeping the roads from icing up. However, salt is corrosive and can damage road surfaces, bridges and vehicles. Sand is popular because it provides needed traction with little or no ill effects. The gritty nature of sand provides a gripping surface for the vehicles. Most often, sand is placed on the roads by city or private crews, typically after a winter storm. Thus, for a time after the icing conditions, the roads may not be sanded. Moreover, even after the sand has been applied, it can be washed or blown away.

Sand is also used to help provide traction for railroad locomotives. These engines have metal wheels that ride on smooth metal rails. Such conditions produce poor traction at times. Railroads use sand to improve traction. The sand is sprayed through nozzles directly in front of the locomotive's wheels. This ensures that a minimum of sand need be applied to achieve the maximum traction.

The use of sand by railroads has been adopted for use in vehicles, although without much commercial success. Examples of such systems are found in the following U.S. Pat. No. 1,810,765 that teaches a sand bag that is placed in the fender before the tire, and an open nozzle that aims a stream of sand under the tire. Discharge of sand is controlled by means of a damper or similar device that is connected to a handle near the driver. U.S. Pat. No. 1,832,581 teaches use of a central sand hopper that feeds sand to the four wheels via conduits. Discharge is controlled from within the vehicle. Nozzles are used to dispense the sand in front of the wheels. U.S. Pat. No. 2,016,419 teaches a large sander for use with busses or other large vehicles. Here, the hopper system is operated by vacuum or pressure lines within the vehicle. U.S. Pat. No. 4,575,135 discloses a device for mounting a sand dispenser on the front of large trucks. This device has a large sand container that sits on top of a nozzle system. Here again, the unit is operated from within the vehicle and the sand is directed towards the tires. Finally, U.S. Pat. No. 5,118,142 teaches use of a central hopper that distributes sand to the wheels via a number of conduits. Again, the sand is directed toward the tires of the vehicle or immediately in front thereof.

As noted above, a key element of providing a sanding system is that the sand must be kept dry. In freezing weather, wet sand freezes as solidly as concrete, making it useless. Moreover, modern vehicles travel at too high a speed to try to place sand directly in front of the wheels, as it is applied in locomotives. Typically, the tires pass over the sand too quickly to do much good unless a steady stream of sand is applied during braking. Such a system requires a large amount of sand to be stored in the vehicle. Moreover such as system also requires frequent refilling with large quantities of sand, which takes time and money. Thus, all the devices discussed above is not be practical for today's vehicles.

SUMMARY OF THE INVENTION

The instant invention overcomes these difficulties. The invention is a sand delivery system for use primarily in automobiles, but may be used in other vehicles as well. It uses the hollow front bumpers found on most modern vehicles today to store bags of sand. The sand is delivered through a number of nozzles located in the front of the vehicle. A blower system forces the sand through the nozzles to project the sand in a wide pattern out in front of the vehicle. The system is designed to operate when the vehicle is braking. Because the sand is disbursed out in front of the vehicle, the tires can better utilize the sand for braking. Moreover, because the sand is projected out in front of the vehicle only a moderate amount of sand is needed to improve traction, thereby reducing the need for large quantities of sand. The sand delivery system can be tied to a manual switch, the vehicle's brake pedal, or to a computer that is tied into the anti-lock brake systems of a car. In the latter case, sand is only be applied when the anti-lock brake system is activated.

DETAILED DESCRIPTION OF THE INVENTION

Figure 1:
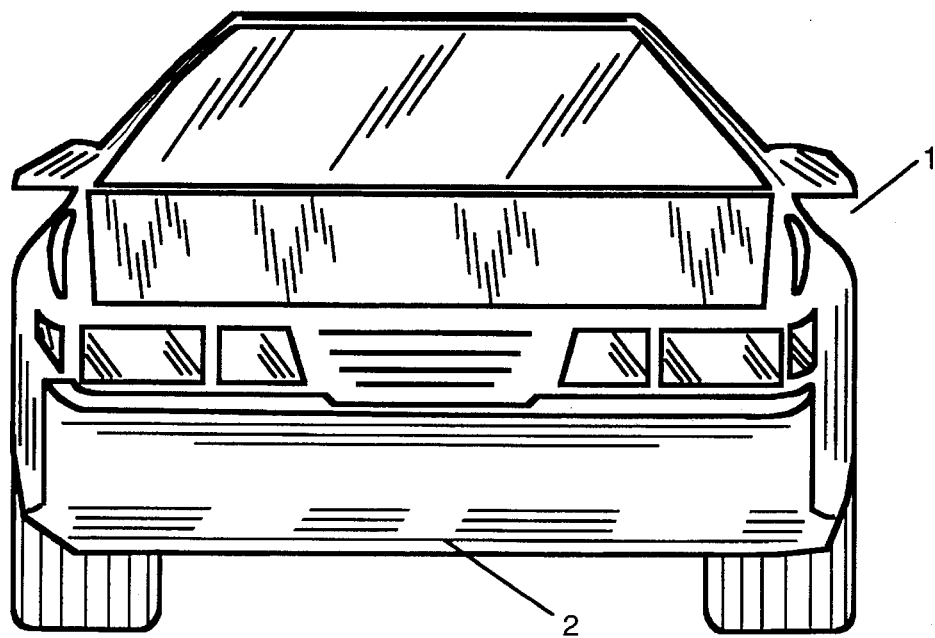
FIG. 1 is a front view of a typical late model car as prior art.
Figure 2:
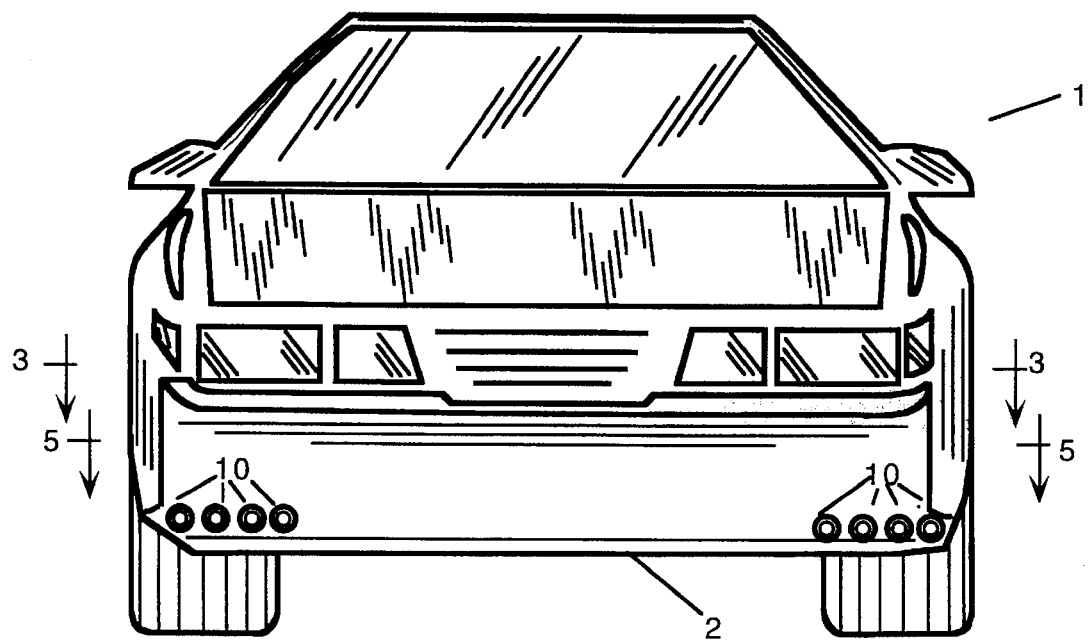
FIG. 2 is a front view of a typical late model car showing the invention installed.

Referring now to FIG. 1, a typical late model car 1 is shown. The car 1 has a composite type bumper 2. FIG. 2 shows the car 1 with the composite type bumper 2 with the invention installed. In this view, the only visible components are the sand spray nozzles 10. In the preferred embodiment, four sand spray nozzles 10 are installed on each end of the bumper 2. This allows a sufficient quantity of sand 31 to be spread over the road in front of the vehicle to provide good traction without using large quantities of sand 31 with each delivery. In the prior art systems, large amounts of sand are needed to stop the vehicle because they all spray sand towards the tires. The vehicle quickly passes over the sand sprayed at the tires, thereby reducing its effectiveness. By spraying the sand out in front of the vehicle, traction is improved with a minimum quantity of sand 31 being delivered.

Figure 3:
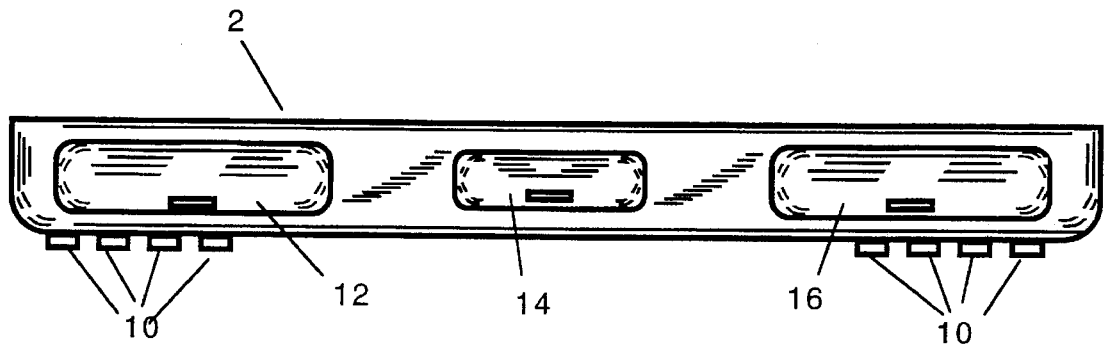
FIG. 3 is a top view of a bumper showing the access doors for the invention taken along the lines 3—3 of FIG. 2.

FIG. 3 is a top view of the bumper 2 showing a number of access doors. In the preferred embodiment, three doors 12, 14, and 16 are provided to allow access to the inside of the bumper 2, where the operating components are kept. In the preferred embodiment, doors 12 and 16 are used as sand filler access doors. Door 14 is used to access the blower 40 and other operating components for maintenance and repairs.

Figure 4:
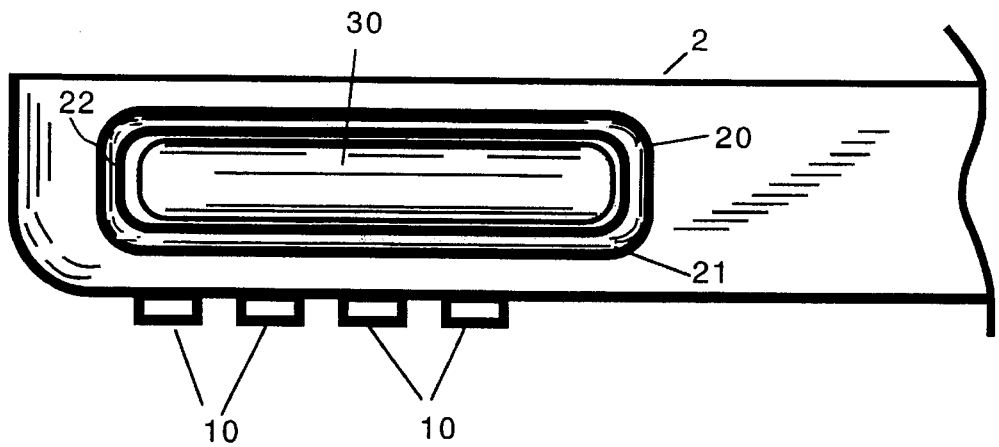
FIG. 4 is a top view of one access door with the cover removed.

FIG. 4 is a detail view of one access door opening 20 with the access door removed. The access door opening 20 has a flange 21 and a gasket 22 that provides a tight seal to prevent dirt and moisture from entering the bumper 2.

Figure 5:
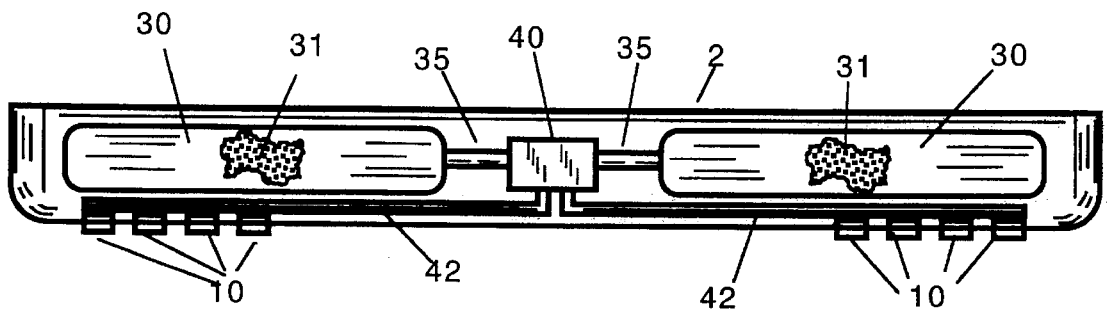
FIG. 5 is a cross section of a bumper taken along the lines 5—5 of FIG. 2.

FIG. 5 is a top view of a bumper section showing the inside of the bumper 2 and the placement of the key components. Two sand bladders 30 are placed as shown. The sand bladders 30 hold a quantity of sand 31 as shown. Conduits 35 are used to move the sand from the bladders 30 to the blower 40 through the blower suction inlet 46. The blower 40 then directs the sand to output ducts 42. These ducts then move the sand to a number of dispensing nozzles 10. In the preferred embodiment, the number of dispensing nozzles 10 is four for each side of the vehicle. Of course, this number can vary depending on the size of the vehicle and the width of the vehicle's tires.

Figure 6:
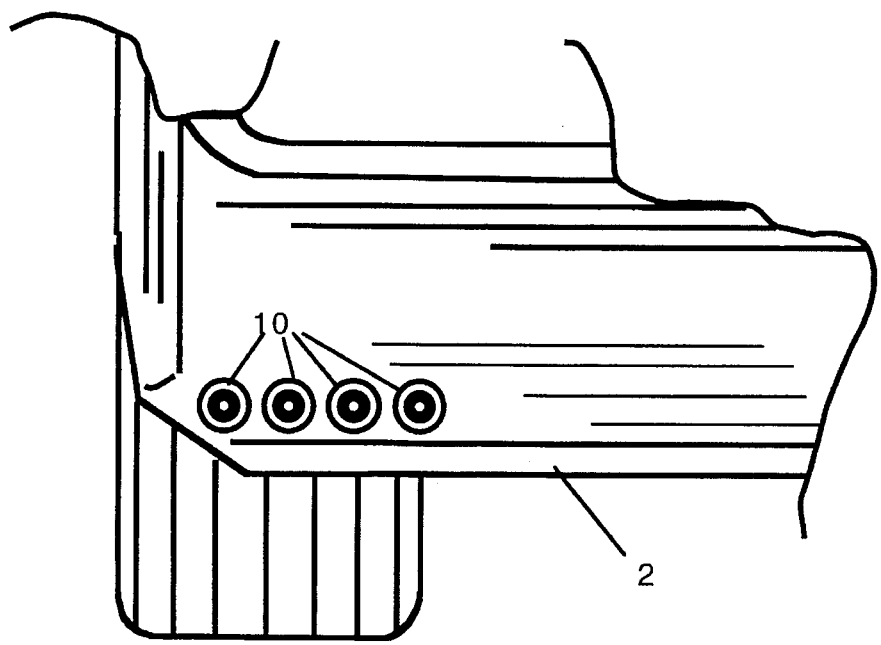
FIG. 6 is a detail front view of a bumper showing the invention.

FIG. 6 is a detail view showing the dispensing nozzles 10 and their placement in the bumper 2. The nozzles are designed to propel sand forward of the vehicle in a broad pattern.

Figure 7:
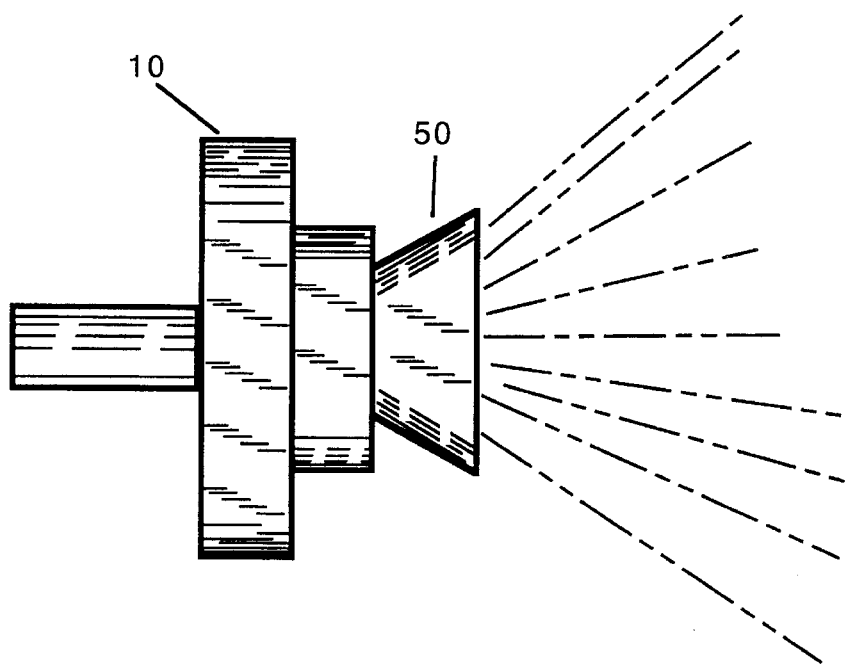
FIG. 7 is a side view of one sand nozzle showing the spray pattern.

FIG. 7 is a side detail view of one nozzle 10 showing the pattern of sand dispersal from the dispensing cup 50. This pattern is not concentrated in a small stream, as in the prior art designs. The pattern is directed to spray sufficient quantities of sand over a broad area in front of the vehicle, thereby ensuring that the tires actually make contact with the sand where and when it is needed.

Figure 8:
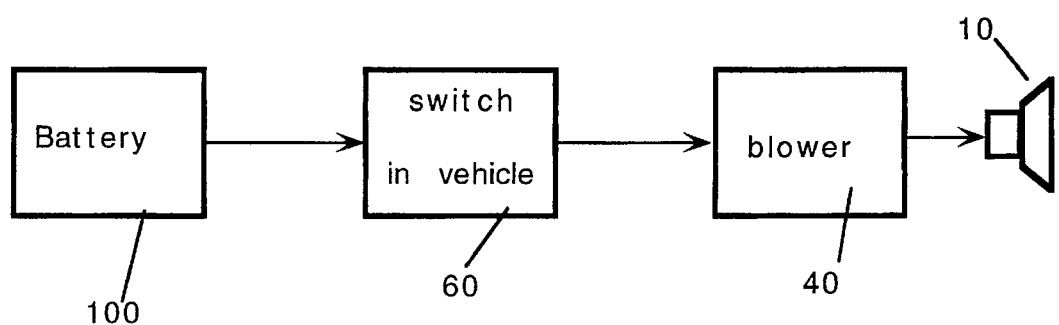
FIG. 8 is a block diagram of one type of control system for the invention.
Figure 9:
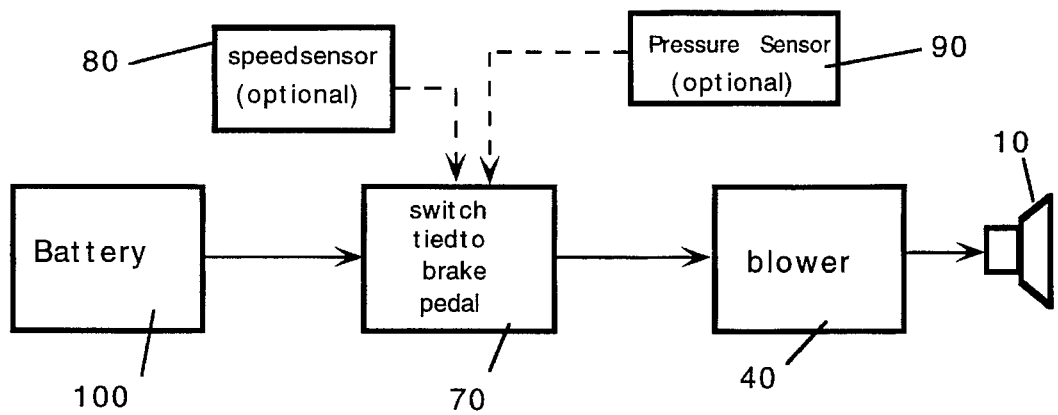
FIG. 9 is a block diagram of a second type of control system for the invention.
Figure 10:
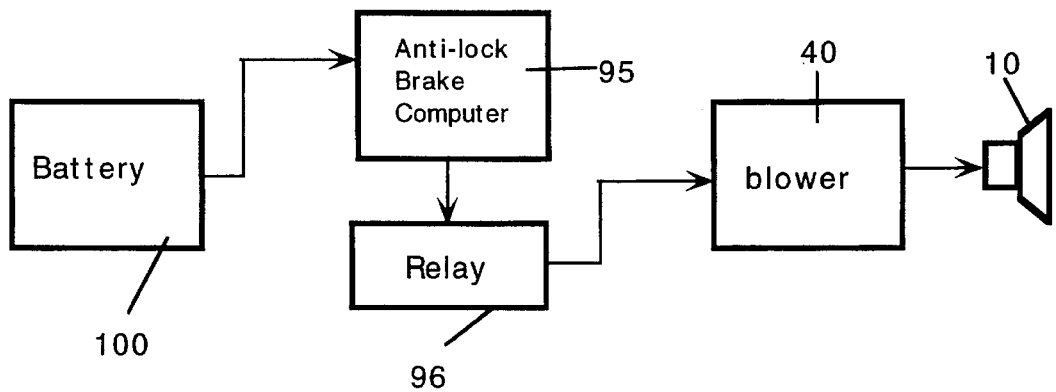
FIG. 10 is a block diagram of a third type of control system for the invention.

FIGS. 8–10 block diagrams showing different operating systems for the device. FIG. 8 shows the simplest operating system. In this system, the blower 40 is operated by the driver using a switch mounted in the vehicle. Although this system is simple, it is not preferred because it requires the driver to operate the system while concentrating on stopping or turning on slippery roads. FIG. 9 shows s system that is tied to the brake pedal. In this system sand can be dispensed every time the driver steps on the brake. To prevent sand dispensing at times that it is not needed, auxiliary switch can be employed to prevent dispensing if, for example, the vehicle has not attained a speed of 15 miles per hour. Another example is where the system is not activated unless sufficient pressure is applied to the brake pedal. FIG. 10 shows a refinement to this system. For vehicles that employ anti-lock braking system, the sand dispenser can be activated only when the anti-lock brake system senses a skid situation. Then, when the anti-lock brake system activates the anti-lock brakes, sand is automatically dispensed. All of these operating systems are simple to implement of course other operating systems that operate in a similar manner can also be used, but are not mentioned here.

The present disclosure should not be construed in any limited sense other than that limited by the scope of the claims having regard to the teachings herein and the prior art being apparent with the preferred form of the invention disclosed herein and which reveals details of structure of a preferred form necessary for a better understanding of the invention and may be subject to change by skilled persons within the scope of the invention without departing from the concept thereof.

I claim:

1. A sand dispensing system for a vehicle having two front tires, comprising:
    a) a hollow front bumper, said hollow front bumper adapted to be fixedly attached to said vehicle, said hollow front bumper also having two ends aligned over the vehicle's two front tires;
    b) at least one sand bladder, removably installed in said hollow front bumper;
    c) nozzle means, fixedly attached to said hollow front bumper, for dispensing sand therefrom, wherein the nozzle means are positioned to spread sand outward in front of said hollow front bumper; and
    d) means for extracting sand from said sand bladder and directing said sand to said nozzle means, fixedly installed in said hollow front bumper.

2. The sand dispensing system of claim 1 further comprising a means for controlling the means for extracting sand from said sand bladder and directing said sand to said nozzle means.

3. The sand dispensing system of claim 1 wherein the means for extracting sand from said sand bladder and directing said sand to said nozzle means comprises a blower having a suction inlet.

4. The sand dispensing system of claim 3 wherein the means for controlling the means for extracting sand from said sand bladder comprise:
    a) an electric motor, installed in said blower;
    b) a switch, adapted to be installed in said vehicle; and
    c) a power source connected to said switch, whereby when said switch is engaged, said power source is connected to said electric motor in said blower.

5. The sand dispensing system of claim 4 wherein the switch is operably connected to a brake pedal adapted to be installed within said vehicle.

6. The sand dispensing system of claim 5 further comprising speed sensing means operably connected to said switch to prevent operation of said blower if the speed of the vehicle is below a preset limit.

7. The sand dispensing system of claim 5 further comprising a pressure sensing means operably connected to said switch and said brake pedal to prevent operation of said blower if pressure applied to said brake pedal is below a preset limit.

8. The sand dispensing system of claim 1 wherein the nozzle means have a dispensing means, fixedly attached to said nozzle means for disbursing sand in a wide pattern in front of said vehicle.

9. A sand dispensing system for a vehicle having two front tires, comprising:
    a) a hollow front bumper, said hollow front bumper adapted to be fixedly attached to said vehicle, said hollow front bumper also having two ends aligned over the vehicle's front tires;
    b) at least one sand bladder, removably installed in said hollow front bumper;
    c) a first nozzle means, fixedly attached to a first end of said hollow front bumper, for dispensing sand therefrom, wherein the first nozzle means are positioned to spread sand outward in front of said vehicle;
    d) a second nozzle means, fixedly attached to a second end of said hollow front bumper, for dispensing sand therefrom, wherein the second nozzle means are positioned to spread sand outward in front of said hollow front bumper;

e) means for extracting sand from said sand bladder and directing said sand to said first and second nozzle means, fixedly installed in said hollow front bumper; and f) means for controlling the means for extracting sand from said sand bladder and directing said sand to said first and second nozzle means.

10. The sand dispensing system of claim 9 wherein the means for extracting sand from said sand bladder and directing said sand to said nozzle means comprises a blower having a suction inlet.

11. The sand dispensing system of claim 9 wherein the nozzle means further comprise a dispensing means, fixedly attached to said nozzle means for disbursing sand in a wide pattern in front of said vehicle.

12. The sand dispensing system of claim 11 wherein the dispensing means comprise a deflector shield.

13. The sand dispensing system of claim 10 wherein the means for controlling the means for extracting sand comprise:

a) an electric motor, installed in said blower;

b) a switch adapted to be installed in said vehicle; and c) a power source connected to said switch whereby when said switch is engaged, said power source is connected to said electric motor in said blower.

14. A sand dispensing system for a vehicle having two front tires, comprising:

a) a hollow front bumper, said hollow front bumper adapted to be fixedly attached to said vehicle, said hollow front bumper also having a front, and two ends aligned over the hollow front bumper front tires;

b) two sand bladders, removably installed in said hollow front bumper;

c) a first set of nozzles, fixedly attached to the front of said hollow front bumper at a first end of said hollow bumper, for dispensing sand therefrom, wherein the first set of nozzles are positioned to spread sand outward in front of said vehicle;

d) a second set of nozzles, fixedly attached to the front of said hollow front bumper at a second end of said hollow bumper, for dispensing sand therefrom, wherein the second set of nozzles are positioned to spread sand outward in front of said hollow front bumper;

e) a dispensing means, fixedly attached to said first and second set of nozzles for disbursing sand in a wide pattern in front of said vehicle;

f) a blower having a suction inlet for extracting sand from said sand bladders and directing said sand to first and second set of said nozzles; and g) a means for controlling the means for extracting sand from said sand bladders and directing said sand to said first and second set of nozzles.

15. The sand dispensing system of claim 14 wherein the means for controlling the means for extracting sand comprise:

a) an electric motor, installed in said blower;

b) a switch, adapted to be installed in said vehicle; and c) a power source, connected to said switch whereby when said switch is engaged, said power source is connected to said electric motor in said blower.

16. The sand dispensing system of claim 14 further comprising at least one access door, removably placed in said hollow front bumper to provide access to the interior of said hollow front bumper.

17. The sand dispensing system of claim 14 wherein the first and second sets of nozzles have four nozzles each.

\* \* \* \* \*